United States Patent
Bartolomé Rodrigo et al.

(10) Patent No.: US 12,185,207 B2
(45) Date of Patent: *Dec. 31, 2024

(54) METHOD OF DISCOVERING SERVICES PROVIDED BY A NETWORK REPOSITORY FUNCTION

(71) Applicant: Telefonaktiebolaget LM Ericsson (publ), Stockholm (SE)

(72) Inventors: Maria Cruz Bartolomé Rodrigo, Madrid (ES); Maria Esther Bas Sanchez, Madrid (ES)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/236,799

(22) Filed: Aug. 22, 2023

(65) Prior Publication Data
US 2023/0413024 A1  Dec. 21, 2023

Related U.S. Application Data

(63) Continuation of application No. 17/355,592, filed on Jun. 23, 2021, now Pat. No. 11,743,699, which is a (Continued)

(51) Int. Cl.
*H04W 4/50* (2018.01)
*H04W 8/02* (2009.01)
(Continued)

(52) U.S. Cl.
CPC ............ *H04W 4/50* (2018.02); *H04W 8/02* (2013.01); *H04W 48/16* (2013.01); *H04W 60/00* (2013.01)

(58) Field of Classification Search
CPC ......... H04W 4/50; H04W 8/02; H04W 48/16; H04W 60/00; H04W 8/20; H04L 67/51; G06F 16/24; G06F 16/23; G06F 16/00
(Continued)

(56) References Cited

U.S. PATENT DOCUMENTS 8,055,751 B2   11/2011   Riordan et al.
8,532,673 B2   9/2013    Walker et al.
(Continued)

FOREIGN PATENT DOCUMENTS

CN    101442436 A    5/2009
CN    103493450 A    1/2014
(Continued)

OTHER PUBLICATIONS

3rd Generation Partnership Project, "3rd Generation Partnership Project; Technical Specification Group Services and System Aspects; Procedures for the 5G System; Stage 2 (Release 15)", Technical Specification, 3GPP TS 23.502 V0.4.0, May 1, 2017, pp. 1-126, 3GPP.

(Continued)

*Primary Examiner* — Huy C Ho
(74) *Attorney, Agent, or Firm* — COATS & BENNETT, PLLC

(57) ABSTRACT

A method of discovering services provided by a network function, NF, in a Service Based Architecture, SBA, based telecommunication network, wherein said network function is registered, in a Network Repository Function, NRF, comprised by said telecommunication network, using a service name, a service address and a selection rule, wherein said selection rule defines a further service address and a precondition for applying said selection rule, said method comprising the steps of receiving, by said NRF, a discovery request, from a Network Function, NF, consumer, wherein said discovery request comprises said service name, determining, by said NRF, that said selection rule applies by determining that said precondition is met based on said received discovery request and transmitting, by said NRF, to said NF consumer, a discovery response, wherein said discovery response comprises said further service address.

18 Claims, 6 Drawing Sheets

Related U.S. Application Data continuation of application No. 16/629,591, filed as application No. PCT/EP2018/071925 on Aug. 13, 2018, now Pat. No. 11,064,325.

(60) Provisional application No. 62/545,177, filed on Aug. 14, 2017.

(51) Int. Cl.
    *H04W 48/16* (2009.01)
    *H04W 60/00* (2009.01)

(58) Field of Classification Search
    USPC .................................................... 455/435.1
    See application file for complete search history.

(56) References Cited

U.S. PATENT DOCUMENTS

| | | | |
|---|---|---|---|
| 9,160,402 B2 | 10/2015 | Petrov | |
| 2005/0276229 A1* | 12/2005 | Torabi | H04L 67/51 370/252 |
| 2009/0116467 A1 | 5/2009 | Shi et al. | |
| 2012/0203864 A1 | 8/2012 | Tóth et al. | |
| 2013/0166703 A1* | 6/2013 | Hammer | H04L 41/5054 709/220 |
| 2015/0350153 A1 | 12/2015 | Layman et al. | |
| 2018/0227871 A1* | 8/2018 | Singh | H04W 48/18 |

FOREIGN PATENT DOCUMENTS

| | | |
|---|---|---|
| RU | 2420036 C2 | 5/2011 |
| RU | 2454010 C2 | 6/2012 |

OTHER PUBLICATIONS

3rd Generation Partnership Project, "3rd Generation Partnership Project; Technical Specification Group Services and System Aspects; System Architecture for the 5G System; Stage 2 (Release 15)", Technical Specification, 3GPP TS 23.501 V0.5.0, May 1 2017, pp. 1-145, 3GPP.

Ericsson, "Pseudo-CR on Service Discovery and Registration Using NRF Service", 3GPP TSG CT4 Meeting #79, Krakow, Poland, Aug. 21, 20171, pp. 1-6, C4-174083, 3GPP.

3rd Generation Partnership Project, "3rd Generation Partnership Project; Technical Specification Group Services and System Aspects; Study on Architecture for Next Generation System (Release 14)", Technical Report, 3GPP TR 23.799 V14.0.0, Dec. 1, 2016, pp. 1-522, 3GPP.

Huawei et al., "Description on NF Service Discovery", SA WG2 Meeting #118bis, Spokane, USA, Jan. 16, 2017, pp. 1-3, S2-170056, 3GPP.

* cited by examiner

METHOD OF DISCOVERING SERVICES PROVIDED BY A NETWORK REPOSITORY FUNCTION

RELATED APPLICATIONS

The present application is a continuation of U.S. Parent application Ser. No. 17/355,592, which was filed on 23 Jun. 2021, which is a continuation of U.S. patent application Ser. No. 16/629,591, which was filed on Jan. 9, 2020, now U.S. Pat. No. 11,064,325, which is a national stage application of PCT/EP2018/071925, which was filed Aug. 13, 2018, and claims benefit of U.S. Provisional Application No. 62/545,177, which was filed Aug. 14, 2017, the disclosures of each of which are incorporated herein by reference in their entirety.

FIELD OF THE INVENTION

The present disclosure generally relates to the field of Service Based Architecture, SBA, based telecommunication networks and, more specifically, to methods and devices for improving the service discovery process.

BACKGROUND

The Fifth Generation, 5G, telecommunications system is under standardization by the Third Generation Partnership Project, 3GPP. A disruptive change is already agreed wherein traditional peer-to-peer interfaces and protocols are modified by a so-called Service Based Architecture, SBA, comprising a plurality of Network Functions, NFs, where each NF provides one or multiple services as a producer to one or multiple consumers, by means of a protocol that is under evaluation in 3GPP stage 3.

For each NF, services have been defined. For example, for the User Data Management, UDM, NF the following services are defined:
   UE Context Management, wherein the basic functionality is to allow a consumer NF to be registered as the serving NF for a particular User Equipment, UE.
   Subscriber Data Management, whose basic functionality is to allow a consumer NF to access to subscription data for a particular UE.
   Authentication, wherein the basic functionality is to allow a consumer NF to get UE authentication data.

One of the drivers of the SBA is to achieve independent Life Cycle Management, LCM, per service. In other words, each SBA service should be able to at least be developed/updated, upgraded, scaled, deployed independently from any other SBA service defined.

In fact, the expectation is to be able to divide existing NFs, that are big "containers" of different functionality, into specific and independent functionality in a way that SW development could be optimized while reuse is increased. But as well, SW implementation, set-up and orchestration in a Cloud Environment is optimized.

However, some SBA services defined in the Third Generation Partnership Project, 3GPP, Fifth Generation, 5G, do not follow these principles. An example of such a node is the UDM NF whose functionalities have just been described. Taking the example of the UDM node, it is further shown how all NFs have not been optimized for the SBA environment.

The "Subscriber Data Management" service offered by the UDM is mainly a service to access a Database, DB, that includes DB access operations such as query, update, delete, create, subscribe, notify.

The "UE Context Management" service is the service that requires to include the most part of the Fourth Generation, 4G, Home Subscriber Server, HSS, logic, e.g. at Registration the consumer requires to receive some subscription data; the relevant data to be provided, internal authorization and consistency checks, depends on whether the consumer is Access and Mobility Management Function, AMF, Session Management Function, SMF, or SMS function, SMSF.

For this reason, the "UE Context Management" service is not well defined to achieve independent LCM, for example:
   Scaling: For AMF, the amount of service requests could be double than for SMF. Then, in order to be able to apply different scaling patterns, to optimize internal resources, each different logic should be defined as a different service, not everything under the same.
   Developing/Updating: If some changes may be required for SMSF business logic, then the whole "UE Context Management" service will need to be updated. Even though required changes may be limited to one/some micro-services, it implies that the SW piece needs updating, re-compilation, basic testing. All development SW tasks are required for the whole Service. Therefore, it is advisable to do not mix different functionalities in the same service, in order to allow independent developing/updating of each functionality.
   Upgrading: a SW piece (Service) (or some of its micro-services) may need upgrading in a real and up and running Cloud Platform. It is recommended to avoid impacting consumers that are not really benefited by upgraded functionality. This could be minimized if each service only provides a specific functionality. There are techniques like rolling upgrade that could be used to minimize consumers' service interruption while upgrading, but the usage could be optimized if each service clearly provides a limited and specific functionality. Deployment: it may be required to just deploy e.g. "SMS Management", but unless this functionality is defined in an independent service, independent development will not be possible. Therefore, UDM services, and other defined services in 3GPP, do not ensure an optimized independent LCM. However, service definition is already fixed in 3GPP, and implementations should normally be compliant to that, in a way to ensure multi-vendor solutions. Therefore, there is a need to redesign the 3GPP SBA in such a manner to ensure an improved independent LCM. Reference is made to the 3RD Generation Partnership Project; Technical Specification group Services and System Aspects; Procedures for the 5G System; Stage 2 (Release 15) dates 2 Jun. 2017, XP051298344. Reference is also made to US 2012/203864, which discloses a method and Arrangement in a Communication Network for Selecting Network Elements.

SUMMARY

It is an object of the present disclosure to overcome the drawback as mentioned above. In a first aspect, there is provided a method of discovering services provided by a network function, NF, in a Service Based Architecture, SBA, based telecommunication network, wherein said network function is registered, in a Network Repository Function, NRF, comprised by said telecommunication network, using a service name, a service address and a selection rule, wherein said selection rule defines a further service address and a precondition for applying said selection rule. The method comprising the steps of:

receiving, by said NRF, a discovery request, from a Network Function, NF, consumer, wherein said discovery request comprises said service name;

determining, by said NRF, that said selection rule applies by determining that said precondition is met based on said received discovery request;

transmitting, by said NRF, to said NF consumer, a discovery response, wherein said discovery response comprises said further service address.

The inventors have found a solution which is compliant to already agreed service definition in 3GPP fifth Generation telecommunication networks. The above will be described in more detail with respect to a Unified Data Management, UDM, but it is noted that this is just an illustrative example. Further, the method as described above ensures an improved independent Lifetime Cycle Management per service or sub-service.

In the context of the present disclosure, the term sub-service is used for demonstrating that a particular service may be divided in one or more sub-services. Each sub-service may provide a slightly different service.

The present disclosure is directed to the concept of service discovery. It was found that the presently, already agreed, mechanism for service discovery may mainly be kept in place. As such, it is not necessary to amend or change the discovery procedures at present.

It is noted that any Network Function is to make the services it provides known to a Network Repository Function, NRF, in a telecommunication network. For example a Network Function may provide its services, its service address and its selection rules to the NRF. The NRF may store these data in a database, and may obtain these data from the database when required. In one of the aspects of the present disclosure, the data may be obtained during a service discovery process.

That is, a particular service consumer, i.e. a Network Function, NF, consumer intends to use a particular service. The NF consumer needs to know where the particular service can be found. As such, the NF consumer sends a discovery request to the NRF for requesting the discovery of a particular service, i.e. a service name.

The NRF is then, according to the present disclosure, able to determine that a selection rule applies by determining that a precondition is met based on the received discovery request. Each service consumer may indicate that a particular service is provided at a particular service address, but, in case a pre-condition is met, a discovery request should not be responded with a conventional discovery response, but with an updated one. That is, if the pre-condition is met, a further service address is to be provided instead of the more regular service address.

The precondition may be explicitly included in the discovery request, or may be derived from the discovery request. For example, the entity requesting the discovery of a particular service may be used as a precondition, or a particular parameter may be included in the request.

In an example, the precondition relates to any of:
a particular NF consumer type such as an Access and Mobility Management Function, AMF, or a Session Management Function, SMF;
a particular consumer identification.

Thus, in case the discovery request originates from a predefined particular NF consumer type, such as an AMF or SMF or the like, the precondition is considered to be met and the selection rule is to be applied.

In a further example, the NF is registered in said NRF using a service name, a service address and a plurality of selection rules, wherein each selection rule defines a further, distinct, service address and a corresponding precondition for applying said corresponding selection rule.

The further, distinct, service address may be an Internet Protocol, IP, address, or any other address, for example a Fully Qualified Domain Name, FQDN, with which said service may be found within the telecommunication network. It is further noted that the same IP address as the "standard" IP address may be used for the further service address, but then with a different port, or anything alike.

In a further example, the plurality of selection rules are associated with a prioritization order for determining which of said plurality of selection rules apply when multiple preconditions are met.

Pragmatically, it may happen that a particular discovery request is received, and that multiple preconditions are met for that particular discovery request. The advantage of the above described example is that, in such a case, it is still possible to apply a single selection rule. The prioritization determines which selection rule is to be applied.

In a further example, the method comprises the steps of:
receiving, by said NRF, from said NF, a service registration request for registering said NF in said NRF, wherein said registration request comprises said service name, said service address and said selection rule;
storing, by said NRF, said service name, said service address and said selection rule;
transmitting, by said NRF, to said NF, a service registration response for acknowledging said received registration request.

The above described example described the situation in which a service producer is able to register its services in the NRF, and is able to register the preconditions that are to be met for applying a particular selection rule for its services.

In a further example, the service address and said further service address are any of:
an Internet Protocol, IP, address;
a Fully Qualified Domain Name, FQDN.

In a second aspect, there is provided a method of registering a service provided by a network function, NF, in a Service Based Architecture, SBA based telecommunication network, in a Network Repository Function, NRF, comprised by said telecommunication network, wherein said method comprises the steps of:
transmitting, by said NF, a service registration request to said NRF, wherein said service registration request comprises a service name, a service address and a selection rule, wherein selection rule defines a further service address and a precondition for applying said selection rule;
receiving, by said NF, from said NRF, a service registration response thereby indicating that said service is registered at said NRF.

The above described example described the situation in which a particular service producer, i.e. NF, is to register its services in an NRF. The existing discovery request is then to be updated in that the discovery request comprises the service name, a service address and a selection rule, wherein the selection rule defines a further service address and a precondition for applying said selection rule.

In a third aspect, there is provided a Network Repository Function, NRF, arranged to support in discovering services provided by a network function, NF, in a Service Based Architecture, SBA, based telecommunication network, wherein said network function is registered, in said Network Repository Function, NRF, comprised by said telecommunication network, using a service name, a service address and a selection rule, wherein said selection rule defines a further service address and a precondition for applying said selection rule, said NRF comprising:

receive equipment arranged for receiving a discovery request, from a Network Function, NF, consumer, wherein said discovery request comprises said service name;

process equipment arranged for determining that said selection rule applies by determining that said precondition is met based on said received discovery request;

transmit equipment arranged for transmitting to said NF consumer, a discovery response, wherein said discovery response comprises said further service address.

The advantages of the first aspect of the disclosure are also inherently a part of the second aspect, and third aspect, of the disclosure. Furthermore, it is pointed out that although the claims read as if all the modules/equipment according to this second aspect of the present disclosure are incorporated into a single node, a person skilled in the art understands that the same disclosure could be implemented by, for example, distributing each of the modules over several nodes. Alternately, the disclosure could also be purely implemented in the cloud, whereby none of the physical nodes possess any of these modules/equipment as such.

Further, it is noted that the equipment may also be referred to as a module, unit, device or anything alike.

In an example, the precondition relates to any of:
a particular NF consumer type such as an Access and Mobility Management Function, AMF, or a Session Management Function, SMF;
a particular consumer identification.

In a further example, the NF is registered in said NRF using a service name, a service address and a plurality of selection rules, wherein each selection rule defines a further, distinct, service address and a corresponding precondition for applying said corresponding selection rule.

In another example, the plurality of selection rules are associated with a prioritization order for determining which of said plurality of selection rules apply when multiple preconditions are met.

In an even further example, the receive equipment is further arranged for receiving, from said NF, a service registration request for registering said NF in said NRF, wherein said registration request comprises said service name, said service address and said selection rule;
and wherein said NRF comprises store equipment arranged for storing said service name, said service address and said selection rule;
and wherein said transmit equipment is arranged for transmitting to said NF, a service registration response for acknowledging said received registration request.

In another example, the service address and said further service address are any of:
an Internet Protocol, IP, address;
a Fully Qualified Domain Name, FQDN.

In a fourth aspect of the present disclosure, there is provided a network function, NF, arranged for registering a service provided by said NF, in a Service Based Architecture, SBA based telecommunication network, in a Network Repository Function, NRF, comprised by said telecommunication network, wherein said NF comprises:
transmit equipment arranged for transmitting a service registration request to said NRF, wherein said service registration request comprises a service name, a service address and a selection rule, wherein selection rule defines a further service address and a precondition for applying said selection rule;
receive equipment arranged for receiving from said NRF, a service registration response thereby indicating that said service is registered at said NRF.

In a fifth aspect, there is provided a computer program product containing computer program code which, when executed by a NF, cause the NF to implement a method in accordance with any of the method examples as provided above.

The above mentioned and other features and advantages of the disclosure will be best understood from the following description referring to the attached drawings. In the drawings, like reference numerals denote identical parts or parts performing an identical or comparable function or operation.

DETAILED DESCRIPTION

Figure 1:
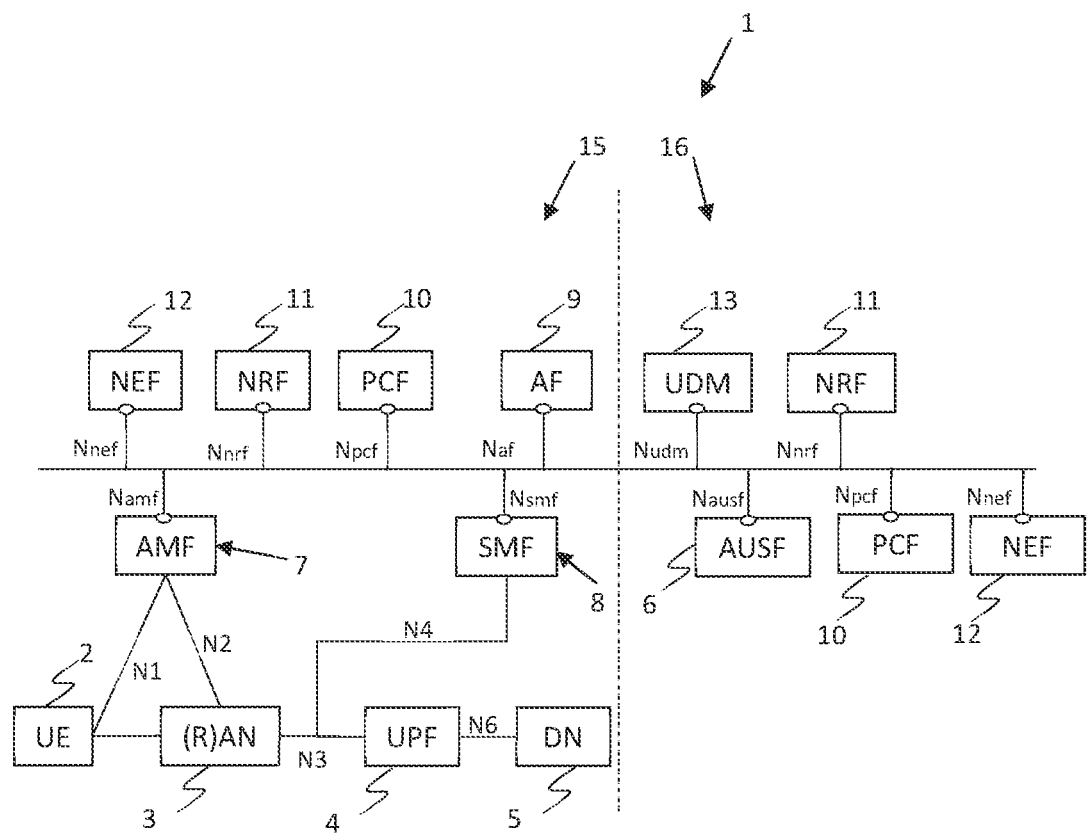
FIG. 1 schematically illustrates a part of the architecture of a Fifth Generation, 5G, telecommunication network.

FIG. 1 schematically illustrates a part of the architecture of a Fifth Generation, 5G, telecommunication network, 1. In FIG. 1, reference numeral 1 indicates a reference architecture for a 5G system. The 5G system architecture comprises the following Network Functions, NFs:

Authentication Server Function, AUSF, 6
Access and Mobility Management Function, AMF, 7
Data Network, DN, e.g., operator services, Internet access or 3rd party services, 5
Network Exposure Function, NEF, 12
NF Repository Function, NRF, 11
Policy Control Function, PCF, 10
Session Management Function, SMF, 8
Unified Data Management, UDM, 13
User Plane Function, UPF, 4
Application Function, AF, 9
User Equipment, UE, 2
(Radio) Access Network, (R)AN, 3.

The functional description of these network functions is specified in clause 6 of the 3GPP standard 23.501, "System Architecture for the 5G system". Specifically, in FIG. 1, reference numeral 1 indicates the system architecture for a 5G telecommunication network in a roaming case. That is, the UE 2 is not in the telecommunication network where it originally belongs to, i.e. is registered. The UE 2 is originally registered with a home network 16, but is presently located in a visited network 15. Such a representation is shown merely for illustrative purposes and is not a limitation of the teachings according to the present disclosure.

Figure 2:
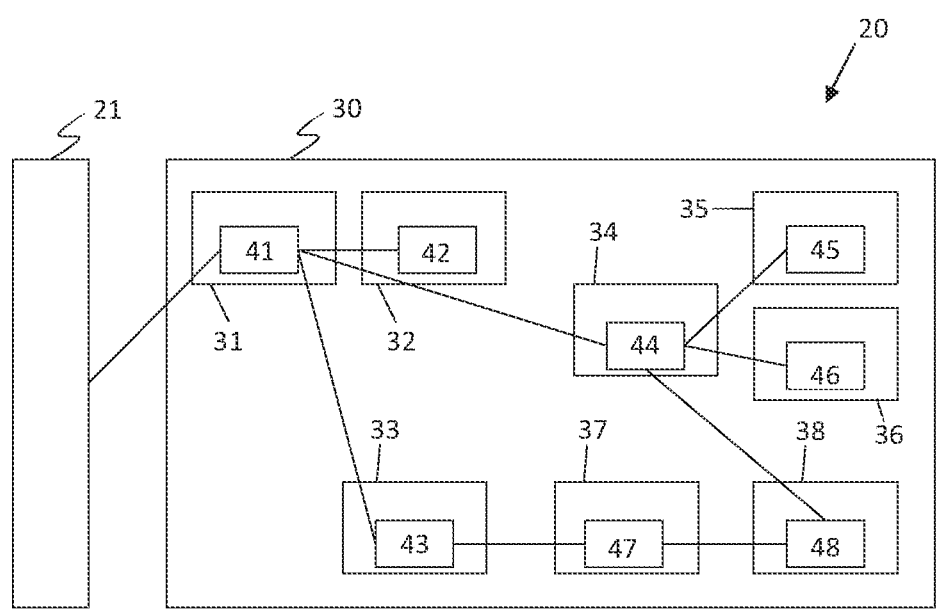
FIG. 2 schematically illustrates an exemplary Network Function, NF, of a 5G telecommunication network.

FIG. 2 schematically illustrates an exemplary Network Function, NF, of a 5G telecommunication network. Reference numeral 20 relates to a situation wherein a consumer service 21 requests a particular service from a producer service 30. As an example, the producer service 30 could be a UE context management service offered by the UDM. Such a service is implemented in a cloud environment by means of several micro services 41-48. The number of micro services and the function performed by each micro service is dependent on the NF and is also dependent on the internal Software architecture.

Figure 3:
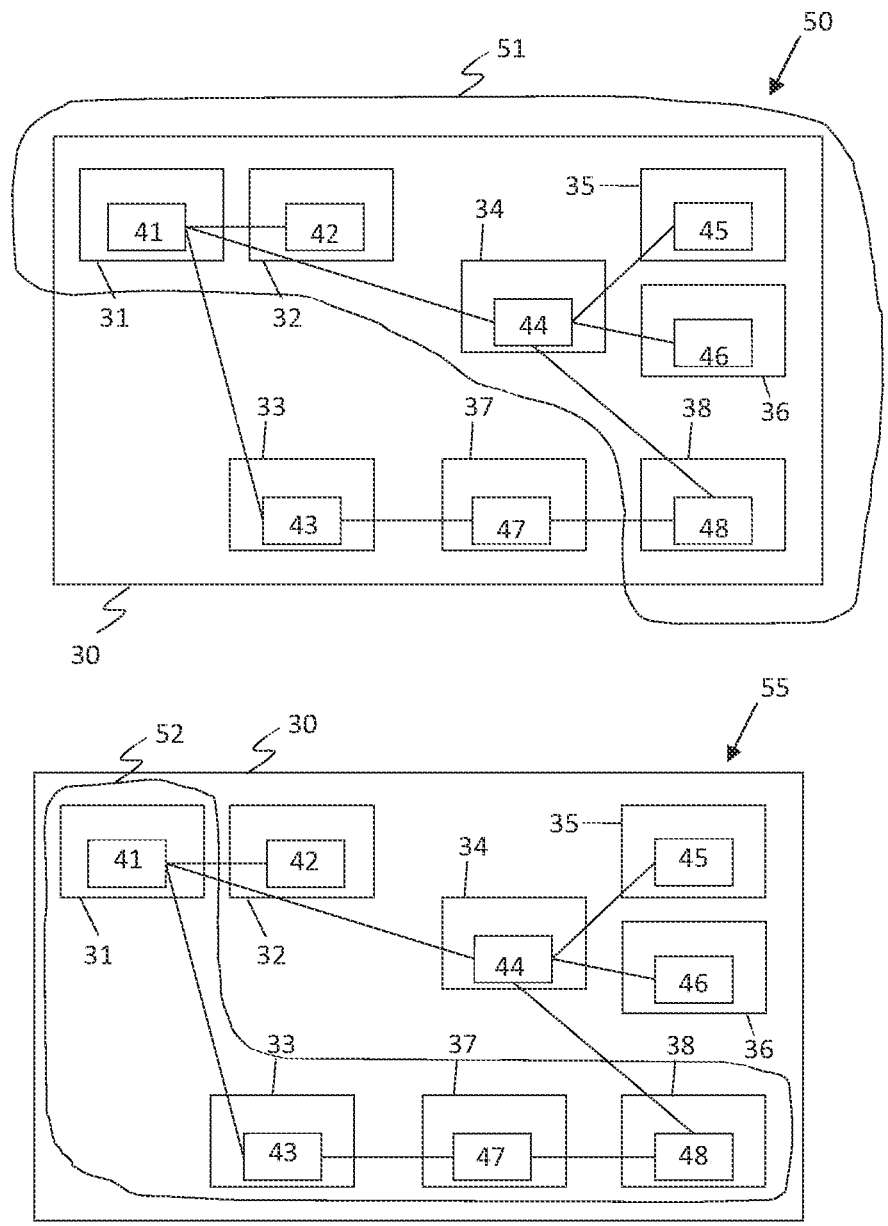
FIG. 3 schematically illustrates an exemplary optimisation of an NF of a 5G telecommunication network.

The micro services are contained within corresponding Virtual Network Function Containers, VNFCs, 31-38. Again considering the example that service 30 refers to a UE context management service offered by the UDM, and the AMF logic requires different micro services than an SMF logic. Such an example is represented by reference numerals 50 and 55 in FIG. 3.

Reference numeral 51 refers to a group of micro services—41, 42, 44, 45, 46, and 48 that are required by the AMF logic and another group 52 formed by micro services—41, 43, 47 and 48 that are required by the SMF logic. Ideally, to achieve the best independent Life Cycle Management, LCM, per service, it would have been better to define AMF management and Session Management as two independent services and not as part of the UE context management service.

According to the present disclosure it is proposed, once the standard is defined, to optimize LCM based on optimization criteria for service registration and discovery. For example, in the above mentioned scenario, the optimization criteria could be the consumer NF type, such that the AMF logic 51 is executed when the consumer NF is the AMF and session management logic 52 is executed when the consumer NF is the SMF.

Figure 4:
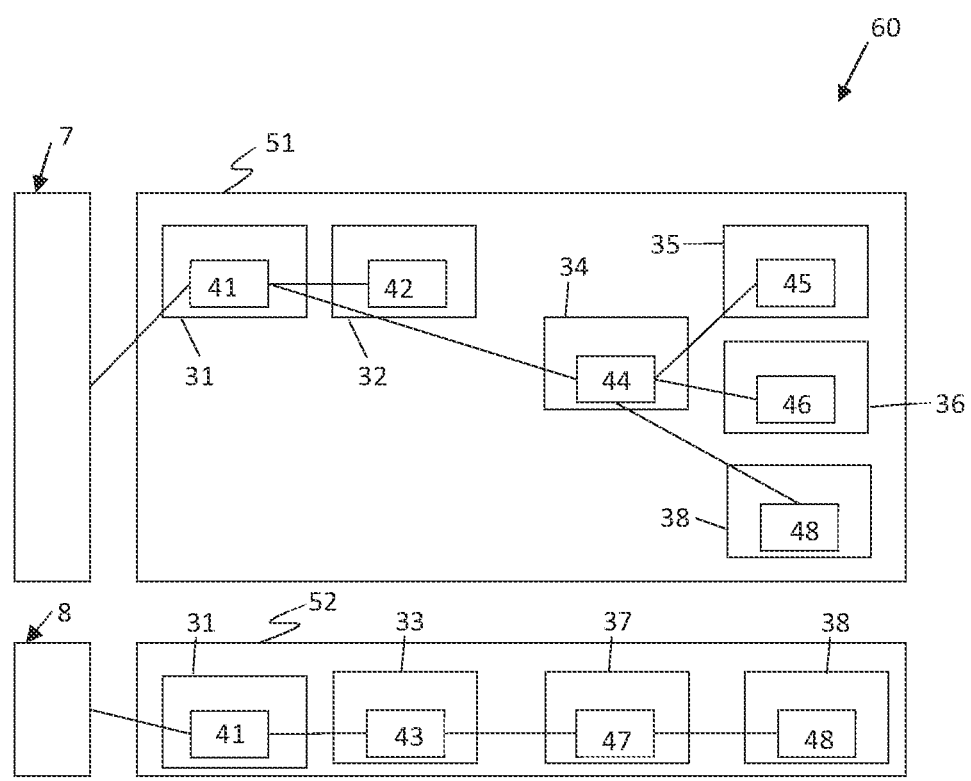
FIG. 4 schematically illustrates an exemplary optimisation of an NF of a 5G telecommunication network.

FIG. 4 schematically illustrates an exemplary optimisation of an NF of a 5G telecommunication network. Reference numeral 60 indicates an embodiment of an optimized UDM function, wherein two optimized sub services 51, 52 have been defined. One of the two sub-services 51 is for Access and Mobility management, when the consumer is the AMF 7 and the other 52 is for session management when the consumer is the SMF 8. In this example, the UE context management service offered by the UDM has been optimized with an optimisation criteria of the consumer NF type. The skilled person understands that other network functions may also be similarly optimized based on different optimization criteria. Alternately, a same network function may be optimized in multiple ways using multiple optimisation criteria.

It is also possible that when independent micro-services are defined, some micro-services may be found in multiple sub-services. In the exemplary embodiment shown in FIG. 4, micro services 41 and 48 may be found in both the sub services 51 and 52. Micro service 41 may be, for example, required for implementing the multivendor interfaces such as Representational State Transfer, REST. As an example, micro-service 38 could be required in both sub-services 51, 52 to implement access to the UDR. But apart from these two micro services 41, 48, the rest of the micro-services could be totally specific for each sub-service.

Figure 5:
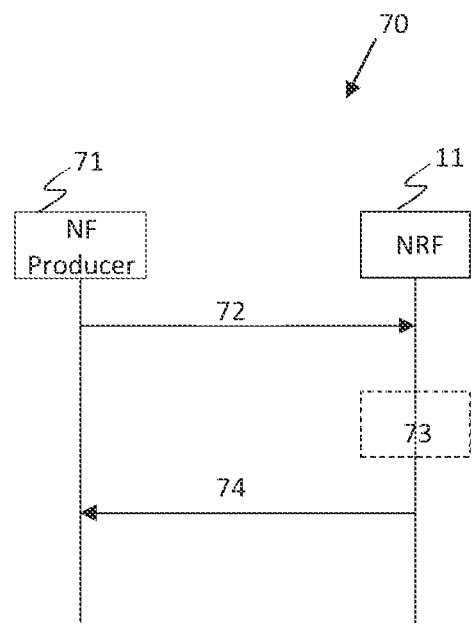
FIG. 5 schematically illustrates a method according to the present disclosure.

FIG. 5 schematically illustrates a method 70 according to the present disclosure. More specifically, the method 70 shows a modified registration process after considering an optimization process according to the present disclosure. As defined in 3GPP 5G Technical Specification, TS, each NF producer 71 registers 72 the services it offers in the NRF 11. At least the following parameters are included:

Service name, identifying the service being registered.
Service address. The service address could be, for example, an Internet Protocol, IP, address or a Fully Qualified Domain Name, FQDN. This may be used by a consumer service to contact the producer service.

According to at least an embodiment of the present disclosure, it is proposed to add optional optimization criteria, i.e. preconditions and selection rules. It should be defined in a way that new optimization criteria could be added. An example optimization criteria is the NFtype. For each criteria, a different Service address is required. This is used to contact the optimized sub-service.

In the example, NFtype=AMF is used as the criteria to identify the UE Context management service 51 optimized for Access&Mobility management. Multiple values for the same criteria may be provided, like e.g. NFtype=SMF. Or even multiple optimization criteria, in which case, it may be required to define a prioritization order, in case multiple criteria may not be valid for the same sub-service.

Definition of optimization criteria and enhancement of the Service Registration may be subject to potential standardization in 3GPP 5G for multivendor solutions. Standardization may be avoided by some configuration in NRF 11, such as by providing specific Service Addresses per NFtype.

In a further step 63, the NRF 11 stores provided one or multiple Service addresses. One address for the SBA service is always provided, and optionally additional addresses could be provided to identify different sub-services, altogether with the optimization criteria, to allow NRF to identify when each Service address should be provided. At the end, the NRF 11 sends a service registration response 74 to the NF producer 71.

Figure 6:
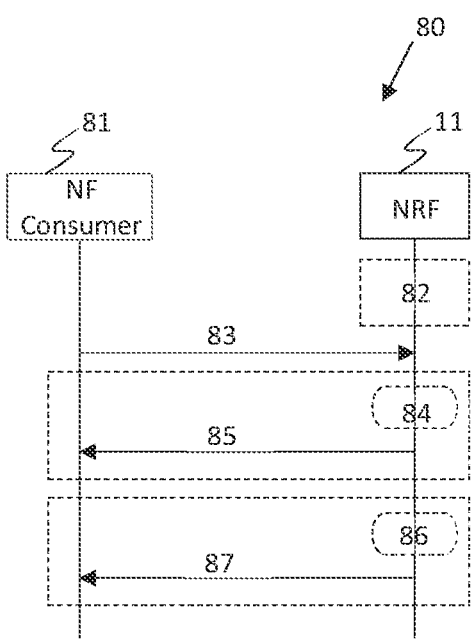
FIG. 6 schematically illustrates a method according to the present disclosure.

FIG. 6 schematically illustrates a method 80 according to the present disclosure. Specifically, the method 80 illustrates a method for service discovery according to the present disclosure. Service discovery may not need any enhancement as long as the optimization criteria is a value that is already provided at regular service discovery. This is the case for the NF type. A service is stored 81 in the NRF 11 according to the method 70.

An NF consumer 81 sends a service discovery request 83 to the NRF 11. Any other optimization criteria not included already for regular Service discovery would need to be defined as optional parameters, subject to standardization, as mentioned for service registration 70. In an example, NF Type will serve as optimization criteria as this parameter may normally be used for service discovery anyway. Other optimization criteria could optionally be added to the request. If so, the Service discovery service will need to be enhanced, and then subject to standardization for multivendor solutions, or a proprietary solution for E/// solutions.

If an optimization criteria is matched 84, then the corresponding sub-service address is provided 85 instead of the SBA service address. According to an example, when AMF is the consumer, the address of the sub-service 51 may be provided, instead of AS-Address. If, however, no optimization criteria is matched 86, then the corresponding SBA service address is provided 87. In our example, AS-Address.

Figure 7:
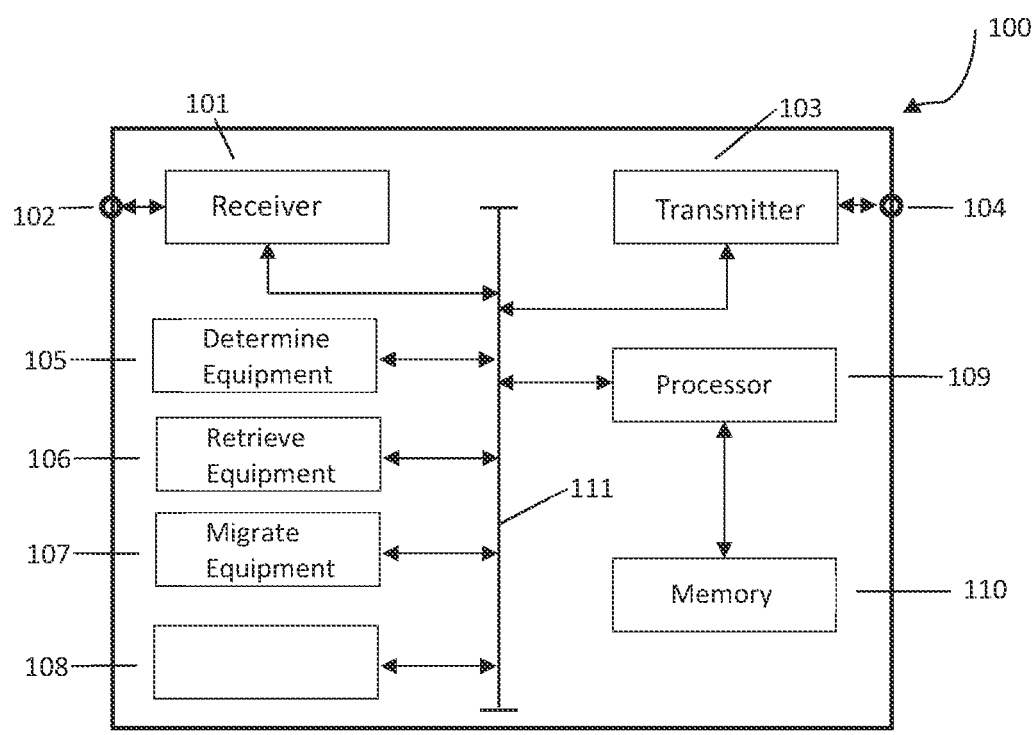
FIG. 7 schematically illustrates an NF according to the present disclosure.

FIG. 7 schematically illustrates an NF according to the present disclosure.

Other variations to the disclosed examples can be understood and effected by those skilled in the art in practicing the claimed disclosure, from a study of the drawings, the disclosure and the appended claims. In the claims, the word "comprising" does not exclude other elements or steps and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage.

A computer program may be stored/distributed on a suitable medium, such as optical storage medium or a solid-state medium supplied together with or as part of other hardware, but may also be distributed in other forms, such as via the Internet or other wired or wireless telecommunication systems. Any reference signs in the claims should not be construed as limiting scope thereof.

The present disclosure is not limited to the examples as disclosed above, and can be modified and enhanced by those skilled in the art beyond the scope of the present disclosure as disclosed in the appended claims without having to apply inventive skills.

What is claimed is:

1. A method of discovering services provided by a network function (NF) producer in a Service Based Architecture (SBA) based telecommunication network, wherein the NF producer is registered in a Network Repository Function (NRF) comprised by the telecommunication network using a service name, a service address, and at least one selection rule, with each of the at least one selection rule defining a further, distinct, service address and a precondition for applying the selection rule, the method comprising the NRF:
   receiving a discovery request from a NF consumer, wherein the discovery request comprises one or more discovery parameters;
   determining a selection rule from the at least one selection rule based on the one or more discovery parameters; and
   transmitting a discovery response to the NF consumer, wherein the discovery response comprises, instead of the service address, the further, distinct, service address associated with the selection rule determined from the at least one selection rule.

2. The method of claim 1 further comprising determining that the selection rule applies by determining that the precondition is met based on the received discovery request.

3. The method of claim 1 wherein a prioritization order indicates which of the at least one selection rule applies when multiple preconditions are met.

4. The method of claim 1, wherein the precondition relates to:
   a particular NF consumer type; or
   a particular consumer identification.

5. The method of claim 1, further comprising the NRF:
   receiving, from the NF producer, a service registration request for registering the NF producer in the NRF; wherein the registration request comprises the service name, the service address, and the selection rule;
   storing the service name, the service address, and the selection rule; and
   transmitting, to the NF producer, a service registration response for acknowledging the received registration request.

6. The method of claim 1, wherein the service address and the further, distinct, service address comprise:
   an Internet Protocol (IP) address; and/or
   a Fully Qualified Domain Name (FQDN).

7. A Network Repository Function (NRF) configured to support discovering services provided by a network function (NF) producer in a Service Based Architecture (SBA) based telecommunication network, wherein the NF producer is registered in the NRF comprised by the telecommunication network using a service name, a service address, and at least one selection rule, with each of the at least one selection rule defining a further, distinct, service address and a precondition for applying the selection rule, the NRF comprising:
   receive circuitry configured to receive a discovery request from a Network Function (NF) consumer, wherein the discovery request comprises one or more discovery parameters;
   processing circuitry configured to determine aa selection rule from the at least one selection rule based on the one or more discovery parameters; and
   transmit circuitry configured to transmit a discovery response to the NF consumer, wherein the discovery response comprises, instead of the service address, the further, distinct, service address associated with the selection rule determined from the at least one selection rule.

8. The NRF of claim 7 wherein the processing circuitry is further configured to determine that the selection rule applies by determining that the precondition is met based on the received discovery request.

9. The NRF of claim 7 wherein a prioritization order indicates which of the at least one selection rule applies when multiple preconditions are met.

10. The NRF of claim 7, wherein the precondition relates to:
   a particular NF consumer type; or
   a particular consumer identification.

11. The NRF of claim 7:
   wherein the receive circuitry is further configured to receive, from the NF producer, a service registration request for registering the NF producer in the NRF, wherein the registration request comprises the service name, the service address, and the selection rule;
   wherein the NRF comprises storage configured to store the service name, the service address, and the selection rule; and
   wherein the transmit circuitry is configured to transmit, to the NF producer, a service registration response for acknowledging the received registration request.

12. The NRF of claim 7, wherein the service address and the further, distinct, service address are:
   an Internet Protocol (IP) address; and/or
   a Fully Qualified Domain Name (FQDN).

13. A non-transitory computer readable recording medium storing a computer program product for discovering services provided by a network function (NF) producer in a Service Based Architecture (SBA) based telecommunication network, wherein the NF producer is registered in a Network Repository Function (NRF) comprised by the telecommunication network, using a service name, a service address, and at least one selection rule, wherein the t least one selection rule defines a further, distinct, service address and a precondition for applying the at least one selection rule, the computer program product comprising program instructions which, when executed by processing circuitry of the NRF, causes the NRF to:
   receive a discovery request from a Network Function (NF) consumer, wherein the discovery request comprises one or more discovery parameters;
   determine a selection rule from the at least one selection rule based on the one or more discovery parameters; and
   transmit a discovery response to the NF consumer, wherein the discovery response comprises, instead of the service address, the further, distinct, service address associated with the selection rule determined from the at least one selection rule.

14. The non-transitory computer readable recording medium of claim 13 wherein the program instructions, when executed by the processing circuitry of the NRF, further causes the NRF to determine that the selection rule applies by determining that the precondition is met based on the received discovery request.

15. The non-transitory computer readable recording medium of claim 13 wherein a prioritization order indicates which of the at least one selection rule applies when multiple preconditions are met.

16. The non-transitory computer readable recording medium of claim 13, wherein the precondition relates to:
   a particular NF consumer type; or
   a particular consumer identification.

17. The non-transitory computer readable recording medium of claim 13, wherein the program instructions, when executed by the processing circuitry of the NRF, further causes the NRF to:
   receive, from the NF producer, a service registration request for registering the NF producer in the NRF, wherein the registration request comprises the service name, the service address, and the selection rule;
   store the service name, the service address, and the selection rule in a storage at the NRF; and
   transmit, to the NF producer, a service registration response for acknowledging the received registration request.

18. The non-transitory computer readable recording medium of claim 13, wherein the service address and the further, distinct, service address are:
   an Internet Protocol (IP) address; and/or
   a Fully Qualified Domain Name (FQDN).

* * * * *